US007519837B2

(12) United States Patent
Smith et al.

(10) Patent No.: US 7,519,837 B2

(45) Date of Patent: Apr. 14, 2009

(54) POWER CONTROLLER

(75) Inventors: David E. Smith, Vacouver, WA (US); Peter C. Nicholson, Vancouver, WA (US); Robert M. Yraceburu, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 663 days.

(21) Appl. No.: 10/869,673

(22) Filed: Jun. 15, 2004

(65) Prior Publication Data

US 2005/0278556 A1 Dec. 15, 2005

(51) Int. Cl.
*G06F 1/00* (2006.01)

(52) U.S. Cl. ........................ 713/300; 713/320; 713/322; 713/324; 713/330; 713/340; 358/1.1

(58) Field of Classification Search ................. 713/300, 713/320, 324, 330, 322, 340; 358/1.1
See application file for complete search history.

(56) References Cited

U.S. PATENT DOCUMENTS

| | | | | |
|---|---|---|---|---|
| 3,767,327 | A * | 10/1973 | Wagenseil | 417/216 |
| 4,809,608 | A | 3/1989 | Wolnick et al. | |
| 5,086,570 | A | 2/1992 | Matheus | |
| 5,187,757 | A * | 2/1993 | Ohno et al. | 385/11 |
| 5,200,708 | A * | 4/1993 | Morris et al. | 330/124 R |
| 5,214,442 | A | 5/1993 | Roller | |
| 5,349,905 | A | 9/1994 | Taylor et al. | |
| 5,457,516 | A * | 10/1995 | Kim | 399/37 |
| 5,842,027 | A * | 11/1998 | Oprescu et al. | 713/300 |
| 6,393,233 | B1 * | 5/2002 | Soulier | 399/88 |
| 7,080,263 | B2 * | 7/2006 | Barr et al. | 713/300 |
| 7,360,100 | B2 * | 4/2008 | Allred et al. | 713/300 |
| 2002/0162080 | A1 * | 10/2002 | Takahashi et al. | 716/7 |
| 2003/0079150 | A1 * | 4/2003 | Smith et al. | 713/320 |
| 2004/0017434 | A1 * | 1/2004 | Okayasu et al. | 347/56 |
| 2004/0023622 | A1 * | 2/2004 | Mantha et al. | 455/115.1 |
| 2004/0030941 | A1 * | 2/2004 | Barr et al. | 713/300 |
| 2004/0139360 | A1 * | 7/2004 | Bliley et al. | 713/320 |
| 2004/0151513 | A1 * | 8/2004 | Nomura | 399/8 |
| 2005/0028014 | A1 * | 2/2005 | Allred et al. | 713/300 |
| 2005/0088678 | A1 * | 4/2005 | Namura | 358/1.13 |
| 2005/0102539 | A1 * | 5/2005 | Hepner et al. | 713/300 |
| 2005/0138438 | A1 * | 6/2005 | Bodas | 713/300 |

* cited by examiner

*Primary Examiner*—Thomas Lee
*Assistant Examiner*—Jaweed A Abbaszadeh

(57) ABSTRACT

One example device embodiment includes at least one first component to draw a first amount of power, at least one second component, and a power controller for allocating a second amount of power to the at least one second component to maintain a sum of the first amount of power and the second amount of power substantially constant.

23 Claims, 6 Drawing Sheets

POWER CONTROLLER

Electrical devices and systems each receive electrical power from a power source in order for a system or device to function. For example, power supplies can include Alternating Current (AC) and Direct Current (DC) from batteries, supply lines provided to buildings or directly to a device or system, and the like.

When in operation, a component of a device or device in a system of devices draws power from a source. This power draw reduces the amount of power available for other components or devices. When an electrical device or component changes the amount of power drawn, such as when a device or component is turned on or off, fluctuating power is drawn from the power source.

This changing load draws fluctuating current from the supply via the impedance of the electrical circuit of the device or system. A fluctuating voltage drop is, therefore, seen within the electrical circuit. If the circuit provides power to other electrical devices or components in the locality, this fluctuating voltage can affect the function of other components or devices connected to the electrical circuit. This phenomenon of fluctuating power is often referred to as flicker.

DETAILED DESCRIPTION

Embodiments of the invention include devices and systems that draw a substantially constant amount of power from a power source. System and device embodiments of the present invention can include any such devices or systems that are susceptible to variations in power consumption such that the system or device would contribute to flicker.

Accordingly, embodiments include various types of printing devices. For example, one type of printing device is an inkjet printing device having a print media dryer. In such devices, each component of the device can have a defined minimum and maximum power that it can draw from a power source.

Additionally, the power source can have a maximum amount of power that it can provide. One way to estimate the amount of power that a device will use is to calculate the sum of the maximum amounts drawn from components that could be drawing power from the power source at the same time. In this way, the calculation can provide the total maximum power that the device could draw at any given time.

However, in some cases, components, like the dryer component in such devices, can draw a significant amount of power in order to provide their function (e.g., proper drying of the ink deposited on print media). In the case of a media dryer, the amount of power that should be used to ensure proper drying can, in some cases, be more than the maximum amount of power available from the power supply as indicated by adding the maximum power draw of the other device components that are used to estimate the maximum draw of power for the device. This is because the maximum possible power consumption of each device connected to the power supply has been used to determine the amount of power available to other attached devices. In this way, when maximums for all devices connected to the power supply are used for the computation regardless of whether they are consuming at their maximum, the amount of power available to other components can be reduced.

Embodiments of the present invention provide mechanisms to estimate the power usage of a device or system in order to allocate power to power consumption components like a media dryer. Embodiments of the present invention can also reduce the variation in the amount of power drawn in order to reduce the potential for flicker to occur based upon the operation of the device or a system, such as a system including a number of devices.

Figure 1A:
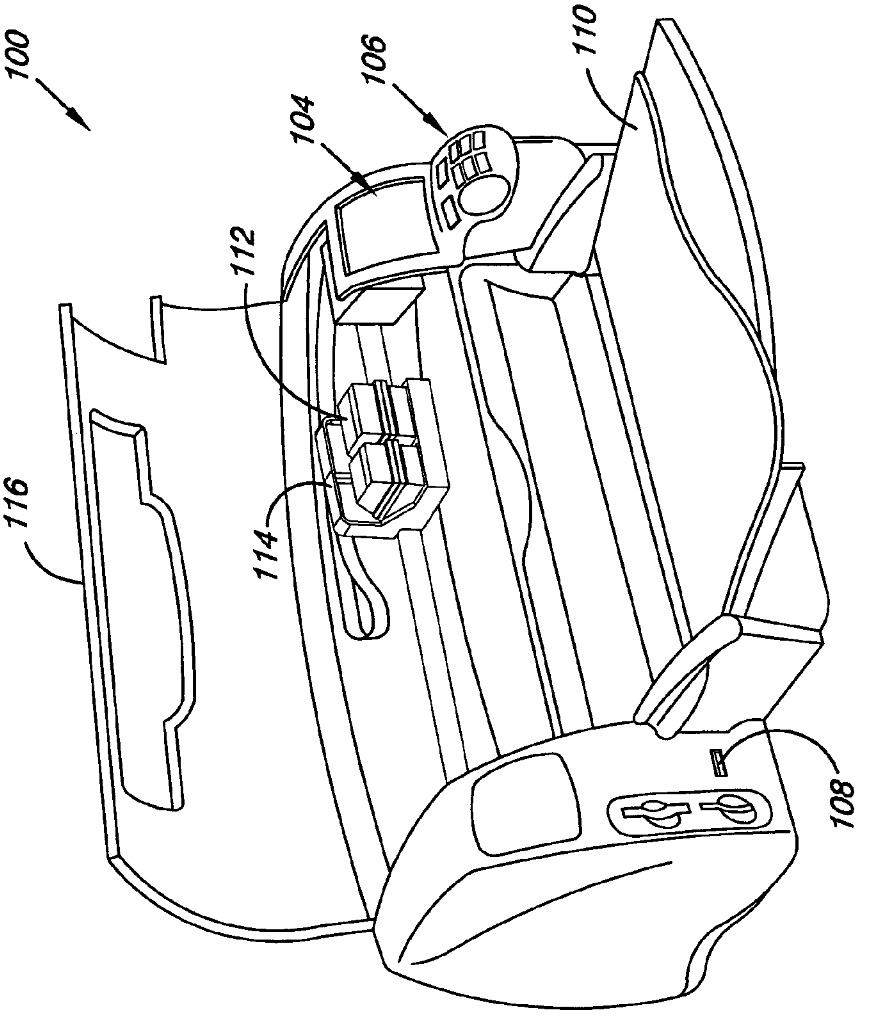
FIG. 1A illustrates an embodiment of an image forming device.
Figure 1B:
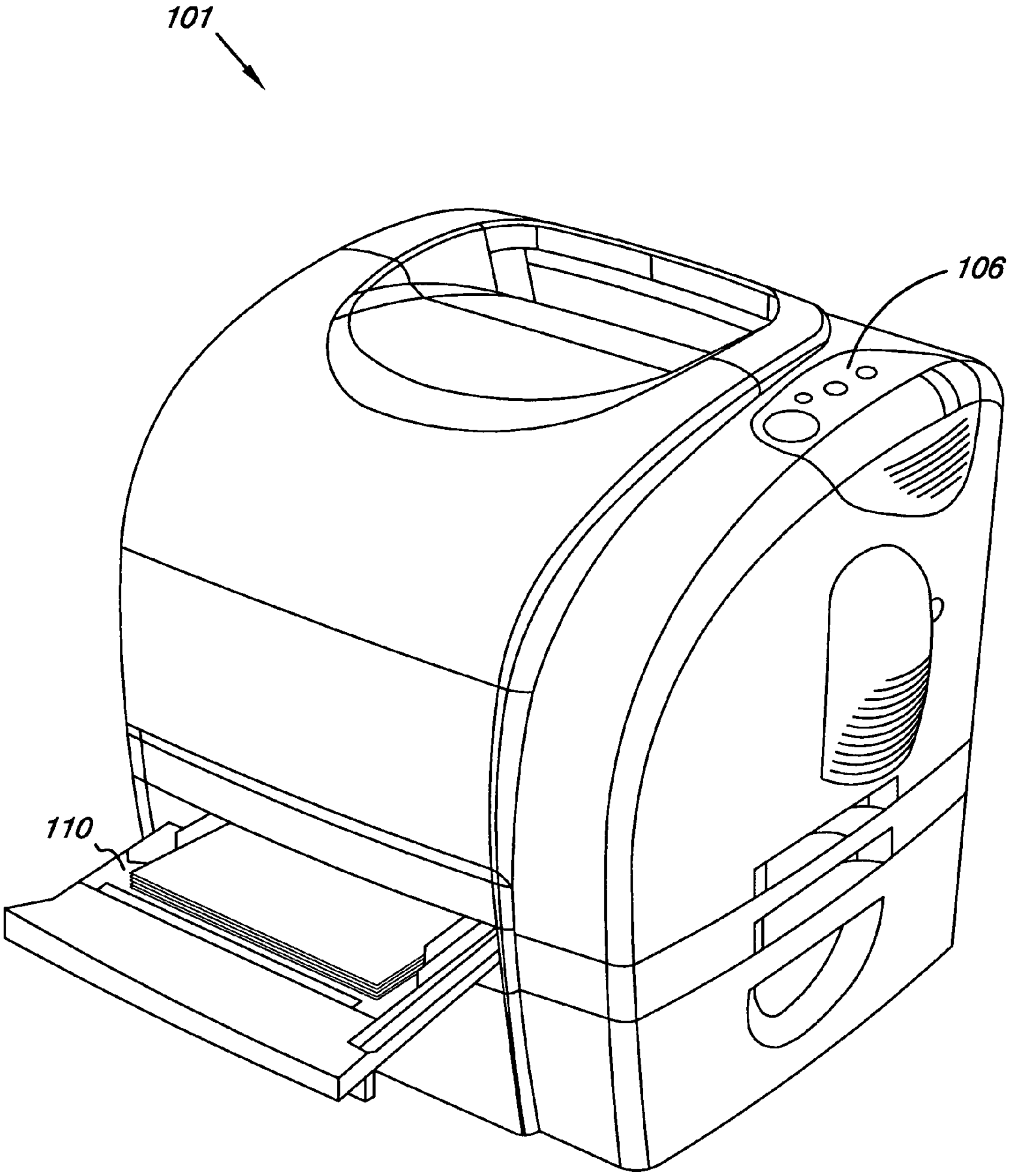
FIG. 1B illustrates another embodiment of an image forming device.
Figure 1C:
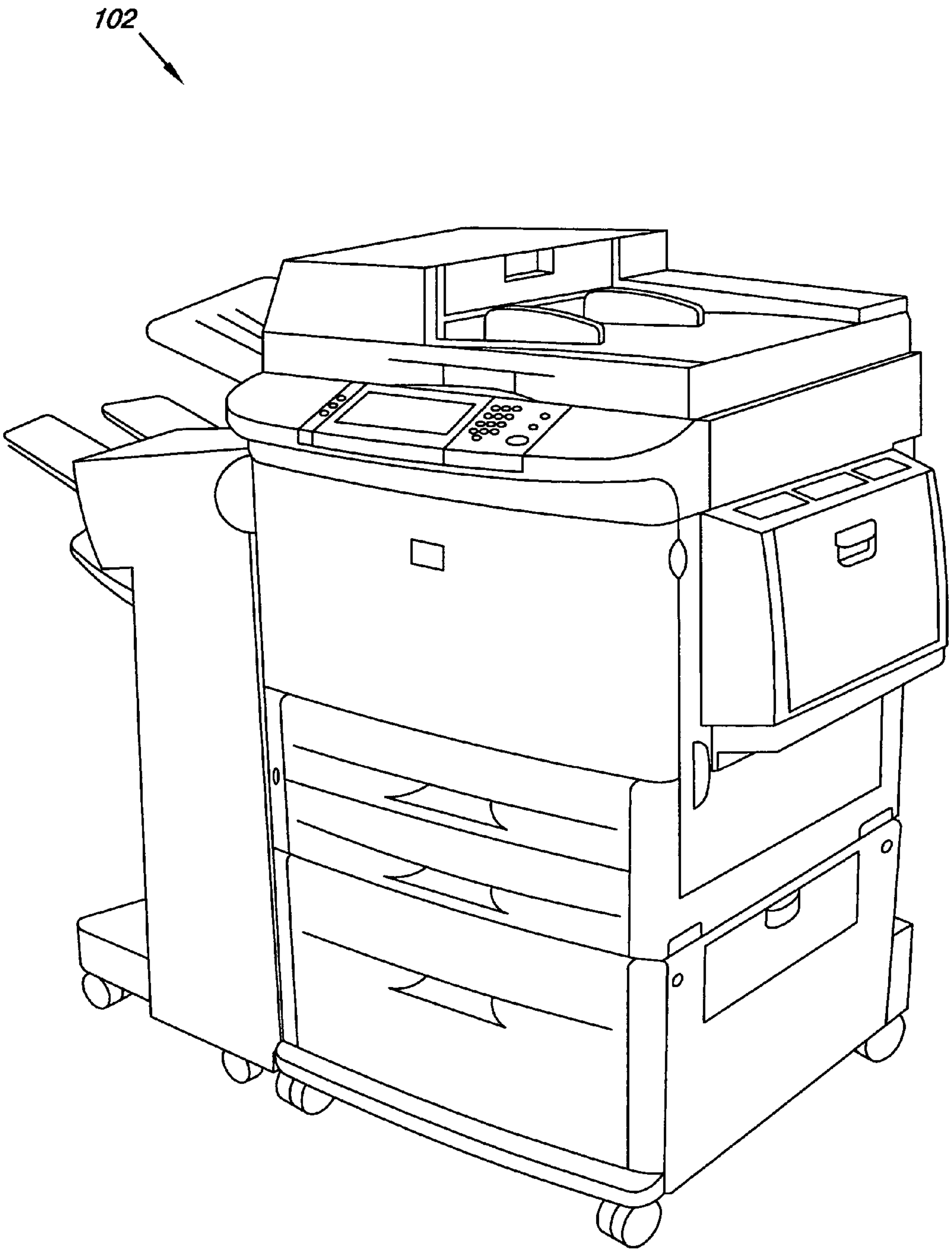
FIG. 1C illustrates another embodiment of an image forming device.

FIGS. 1A-1C illustrate various types of printing devices in which embodiments of the present invention can be used. As stated above, the embodiments of the present invention are not limited to use with the illustrated devices nor are they limited to use with printing devices.

FIG. 1A provides a perspective illustration of an embodiment of an image forming device 100, such as a printing device, which is operable to implement, or which can include, embodiments of the invention. The embodiment of FIG. 1 illustrates an inkjet printing device 100 which can be used in an office or home environment.

As illustrated in FIG. 1A, the image forming device (printing device 100) includes a number of user interface input/output (I/O) control mechanisms such as a control console 106 with an input keypad for data entry and an I/O port 108 for receiving data from other devices as well as a display 104. The printing device 100, illustrated in FIG. 1A, can operate as a stand alone device and/or can be used as a printing device in a networked system.

In the embodiment shown in FIG. 1A, the printing device 100 includes a print cartridge 112 mounted in a movable print carriage 114 within device housing 116. The print cartridge 112 contains both an ink reservoir and a printhead for ejecting ink onto print media.

The movable print carriage 114 can move to scan the print cartridge 112 across the print media while performing a print job. Embodiments of the invention, however, are not limited to applications with a movable print carriage. For example, embodiments include inkjet printing devices or laser/light emitting diode printing devices in which print media moves underneath a stationary print cartridge.

The device of FIG. 1A also includes a print media supply tray 110 that is used to hold the print media for printing. In conjunction with the print media supply tray, the device can include conveyance mechanisms for conveying the print media past the printheads. Such conveyance mechanisms can include rollers, drums, and the like.

FIG. 1B illustrates another embodiment of an image forming device. The embodiment of FIG. 1B depicts a larger volume image forming device 101 with a control console 106 provided to a user on the top of the device 101 and one or more print media supply trays 110 provided underneath. The embodiment of FIG. 1B can include the other components discussed above.

As with FIG. 1A, the console 106, shown in FIG. 1B, can be used to enter information into the device 101. As stated above, the embodiment of FIG. 1B may additionally include a drum media conveyance mechanism in which the print media moves in a curved path past the printheads. The printing device 101, illustrated in the embodiment of FIG. 1B, is another example of a device structure which can implement embodiments of the invention.

FIG. 1C illustrates another embodiment of an image forming device 102 with which embodiments can be implemented. The embodiment of FIG. 1C illustrates a multifunction inkjet printer 102, which can be used in a business environment for reports, correspondence, desktop publishing, pictures, and the like. The embodiment of FIG. 1C depicts yet a larger volume image forming device than that shown in FIG. 1B. The embodiment of FIG. 1C may also include a drum media conveyance mechanism, as discussed in connection with FIG. 1B. Again, embodiments of the invention are not limited to the image forming device examples illustrated in FIGS. 1A-1C.

Figure 2:
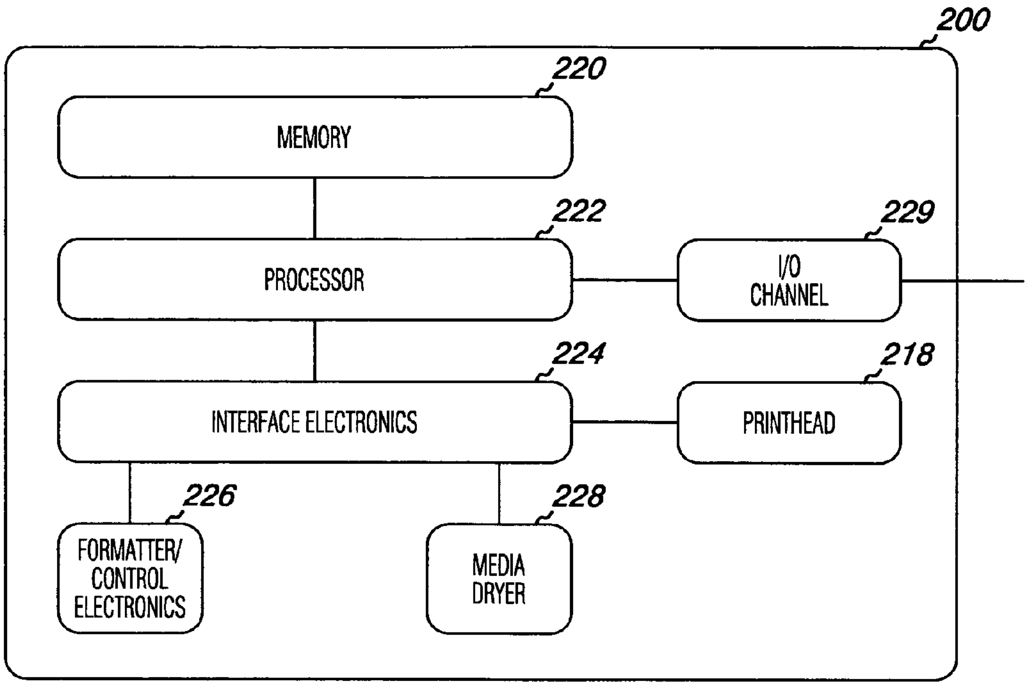
FIG. 2 illustrates a block diagram of an embodiment of electronic components for an image forming device.

FIG. 2 illustrates an embodiment of some of the electronic components associated with an image forming device 200, such as printing devices 100-102 shown in FIGS. 1A-1C. As shown in FIG. 2, the electronic components of image forming device 200 include an embodiment of a media marking mechanism, such as printhead 218, memory 220, processor 222, interface electronics 224, formatter and/or control electronics 226, media dryer 228, and I/O channel 229.

Electronic components of image forming device 200 can also include control logic in the form of executable instructions which, for example, can exist within memory 220 and can be executed by a controller and/or processor, such as processor 222. Generally, the executable instructions can be used to carry out various control steps and functions for the image forming device 200, such as to eject ink drops onto the print media, move the print media, control the dryer, and other such printing functions.

Memory 220 can include some combination of ROM, RAM, magnetic media, and optically read media, and/or some type of nonvolatile and writeable memory such as battery-backed memory or flash memory. The processor 222 is operable on software, e.g., computer executable instructions, received from memory 220 and/or via an input/output (I/O) channel 229. The embodiments of the invention, however, are not limited to a specific type or number of processors or controllers or to any particular type or amount of memory and are not limited to where within a device or networked system these components or a set of computer instructions reside for use in implementing the various embodiments of invention.

The processor 222 can be interfaced, or connected, to receive instructions and data from a remote device, e.g., over a local area and/or wide area network (LAN/WAN), through one or more I/O channels or ports 229. I/O channel 229 can include a parallel or serial communications port, and/or a wireless interface for receiving data and information, e.g. print job data, as well as other computer executable instructions, e.g., software routines. The I/O channel can also include ports and/or slots, such as a USB port or a memory card slot for use with memory devices such as memory cards, sticks, disks, and the like.

Interface electronics 224 are associated with the image forming device 200 to interface between the control logic components and the electromechanical components of the printer such as the printhead 218, formatter/control electronics 226, and media dryer 228. As illustrated in FIG. 2, the interface electronics 224 are coupled to the printhead 218, formatter/control electronics 226, and media dryer 228. Interface electronics can be coupled to the electromechanical components in any suitable manner to control the operation thereof.

Media marking mechanisms, such as printhead 218, can be of various forms. For example, many printheads have a number of nozzles thereon that are electrically controlled to fire ink or another marking medium onto print media. Some printheads use heaters during the process of preparing the ink to fire from the nozzle. In such devices, the number of nozzles firing and the duration and time between firing can affect the amount of power used by the printhead. In addition, printheads generally include some control firmware that also uses power in calculating when to fire each nozzle and to perform other printing functions.

In various embodiments, the interface electronics 224 can also be coupled to formatter/control electronics 226. The formatter/control electronics 226 also use power in order to perform their formatting and/or control functions. These components tend to use a relatively fixed amount of power. However, based upon ambient conditions, such as temperature, humidity, age of the component, duration of use, and the like, the components can be somewhat variable in their amount of power usage. The amount of power that these components use can also vary based upon their on/off state. It is noted that various other types of components are used in devices and that these components can draw power that is accounted for in calculating the amount of power drawn by a device.

As stated above, media dryers, such as media dryer 228, are used to dry ink or other marking media used to mark print media. A media dryer can include heating elements, fans, sensors, and other electrically driven elements.

Components such as media dryers can draw a significant amount of power in order to provide their function (e.g., proper drying of the ink deposited on print media). Embodiments of the present invention use a method of monitoring the power usage of various components of a device or system to identify how much power can be allocated to one or more high power consumption components such as a media dryer. This is accomplished, in some embodiments, by separating the one or more high power consumption components from the other components of the device or system.

The power drawn for the number of other components (e.g., first components) can then be measured. From this measurement, if the maximum power available from the power source has been determined, then the total remaining amount of power available at that point in time can be identified and allocated to the one or more high consumption components (e.g., second components).

Embodiments can also define a desired amount of power that is less than the maximum amount of power available from the power supply. This can be useful, for example, to provide a buffer in order to not overtax the power supply. This arrangement can also be useful when allocating a total power for a device within a system with multiple power drawing devices. In this way, one or more of the devices can use embodiments of the invention to more accurately measure and allocate power, while with respect to the system; the power requirements of each device may still be estimated in order to better forecast power requirements for the system. An example of an electrical circuit for monitoring the power consumption within a system or device is provided below in FIG. 3.

Figure 3:
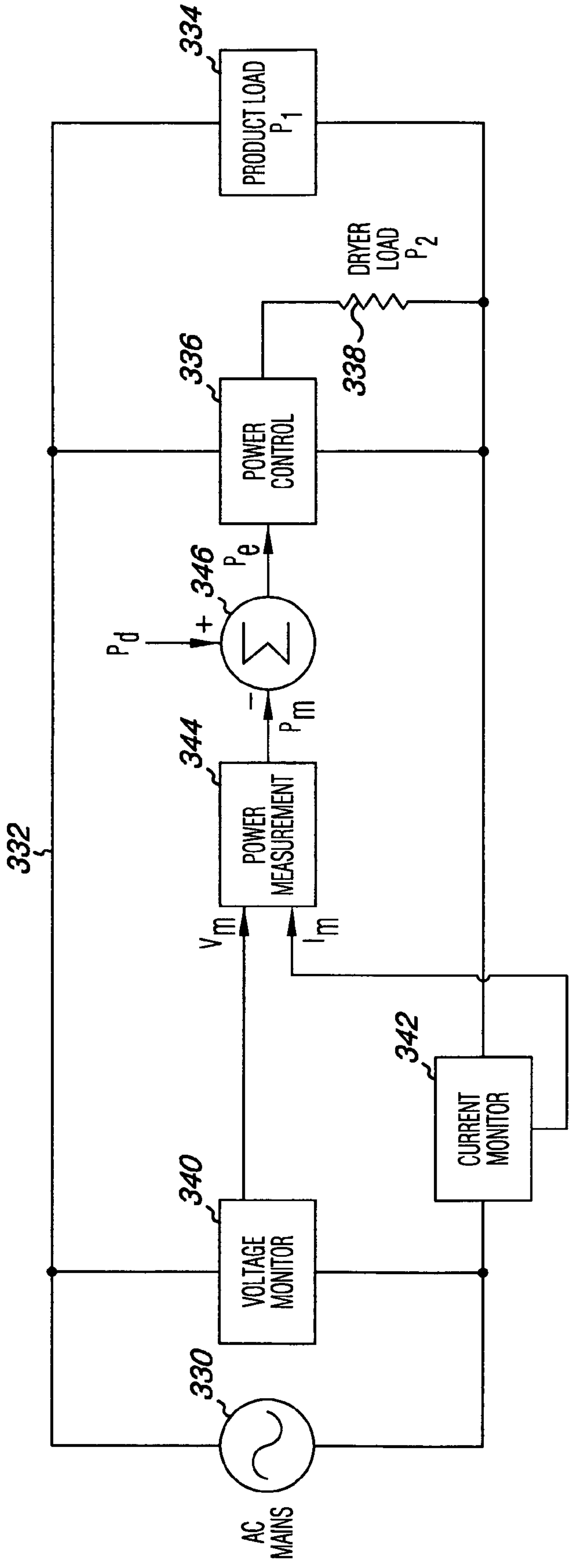
FIG. 3 illustrates a block diagram of an electrical circuit embodiment of an image forming device.

FIG. 3 illustrates a block diagram of an electrical circuit embodiment of an image forming device. The electrical circuit shown in FIG. 3 includes a power source 330, a line 332 for conveyance of the power to the components of the device or system, a number of first components that produce a product load 334, a power control 336, and a media dryer that produces a dryer load 338.

In addition to these components, the circuit illustrated in FIG. 3 also includes a voltage monitor 340, a current monitor 342, a power measurement component 344, and a power availability computational component 346. These components can be provided in a single physical component (e.g., on a single computer chip), or multiple units. Such embodiments include a computer chip (e.g., for voltage monitoring, current monitoring, and power measurement functions) and firmware, such as on a central processor (e.g., for calculation of the power adjustment to be made by the power control component) for processing various functions of the device or system in addition to those related to the embodiments of the present invention.

For instance, the power measurement and power availability computational components can be separate physical components, can be provided in a single physical component, or can be provided by computer executable instructions within one or more of the other components such as the voltage monitor 340, current monitor 342, or the power control 336, for example.

As discussed above, the power source 330 can be any component that can provide power to a device or system and can include power supplies located proximate to a system or device, such as batteries, solar cells, etc., or remote power supplies such as power from a power station. In the electrical circuit illustrated in FIG. 3, for example, AC Mains is identified as the power supply 330 for the circuit. Other examples of suitable power sources include, but are not limited to, a portable or fixed power generator, such as a portable AC generator.

The power control 336 is used to allocate power to components, such as those that have high consumption. For example, high consumption components within an image forming device include, but are not limited to, media dryers, vacuum systems (e.g., a media vacuum hold down system), media marking mechanisms (e.g., pens, print nozzles, and the like), and components of such components (e.g., motors, heaters, etc.), among others. Examples of components that can be implemented as power controllers include, but are not limited to, solid state switches, such as a Triode AC (TriAC) switch or a silicon controlled rectifier (SCR).

In the example illustrated in FIG. 3, the power control 336 is allocating power to a media dryer, which is creating a dryer load 338 on the device or system. However, the disclosed subject matter is not limited to allocating power to high consumption components, but can be used for any component in which allocation based upon power available is desired.

Additionally, the power control can be used to allocate power to a number of second components which create a combined load, similar to the load shown for the dryer 338. For example, the power drawn by a media dryer and a media vacuum hold down system can each be varied based upon the amount of power available to be allocated by the power control. The allocation of power between these components can be done in any manner.

For instance, the power can be allocated based upon characteristics of the job that is to be done by the device. With respect to the two components discussed above, for example, in cases where a thick material is to be printed on, more power could be allocated to the media vacuum hold down system, while less is allocated to the media dryer. In instances where the print media has a large amount of print to be deposited thereon, more power can be allocated to the print dryer, while less is allocated to the media vacuum hold down system. In this way, the power usage of systems and/or components within a device can be balanced with respect to each other based upon various factors.

In the embodiment illustrated in FIG. 3, the media dryer is the component in which available power is to be allocated. Accordingly, the other electrical components of the device or system are measured to provide a product load 334 excluding the media dryer load 338. For example, with respect to the device described in FIG. 2, the other components can include components such as the memory, processor, interface electronics, I/O channel, printhead, formatter/control electronics, and other such components within the device or system.

Components can also include items such as controllable paper trays, and printing device displays, and other such components. These components can get their power directly from the main power supply to the device or system or can get power from a sub-power supply provided within the device or system. Sub-power supplies can also be considered a component since they consume power for operation.

As described above, embodiments of the invention can allocate a constant or substantially constant amount of power from the power supply. In this way, large variations in power drawn from the device or system can be reduced or eliminated, thereby reducing the potential for the inducement of flicker, among other things.

In various embodiments, the power draw can be viewed as substantially constant rather than constant, such as where the power supplied may change during the time between the measurements of the device or system power. In such cases, the power can be viewed as fluctuating around a constant target amount of power. These instances would be considered constant for purposes of the embodiments of the present invention.

In order to maintain a constant draw of power from the power supply, a set amount of power can be determined and this power can be allocated to the components of the device or system. For example, the circuit shown in FIG. 3 can measure the total power of the system ($P_m$). This quantity can then be compared to a desired power level ($P_d$). The difference between $P_m$ and $P_d$ is $P_e$ (i.e., the error between the two quantities). This value can be used by the power controller 336, to adjust the power to the dryer.

In order to achieve a substantially constant draw from the power supply 330, the error value $P_e$ should be near or equal to zero. In this way, the desired power level and the measured power level are substantially the same.

In another example, if the product load 334 is measured, then the remainder of the available power from the power supply can be allocated by the power control 336 to the dryer load 338. In this way, all power allocated from the power supply is used by the components of the device or system.

The electrical circuit illustrated in FIG. 3 shows an arrangement of components for providing such a measurement and allocation of the available power. In the example illustrated, a current monitor 342 can be used to measure the total current ($I_m$) being used by the device or system. Current monitors can include analog and/or analog to digital components such as resistors, and the like.

A voltage monitor 340 can be used to measure the voltage ($V_m$) of the total power available to the device. Voltage monitors can include analog and/or analog to digital components such as resistors, op-amps, and the like.

These measurements can then be used by the power measurement component 344 to identify the power used in the device or system $P_m$ based upon the formula P=IV. With respect to the components of the device or system, $P_m$ is equal to the power used by the combination of first and second components (i.e., $P_m=P_1+P_2$). The power measurement component 344 can include components such as analog, analog to digital, and/or digital components, including signal processors, and the like.

The power availability computational component 346 can then use a desired power $P_d$ and total power used $P_m$ to define the power available to the media dryer. The desired power or total power used can, for example be based upon a maximum circuit power value, a power supply circuit breaker rating, or a manufacturer or user defined power threshold, among others.

The power availability computational component 346 can, for example, determine the power to be allocated to the second components by subtracting $P_m$ from $P_d$ to define a difference between the power used $P_m$ and the desired power $P_d$. As stated above, this quantity is represented by $P_e$ (e.g., $P_d-P_m=P_e$). The value $P_e$ is then used to adjust the power provided to the dryer (e.g., a second component) $P_2$ such that $P_d$ is substantially equal to $P_m$. With $P_2$ set according to the difference between $P_m$ and $P_d$ for a given time period, when a measurement is taken for the next time period, the deviation of $P_m$ from $P_d$ can be reduced or removed by adjustment of $P_2$ based upon the measurements taken for the previous time period. The power availability computational component 346 can be provided by computer executable instructions in firmware and/or software, for example.

The above method of computing the power allocated to the second components of a device is provided as one of many methods. Accordingly, the embodiments of the present invention are not limited to this method of calculation or to this method of monitoring the power usage of a device or system. The above described electrical circuit provides a mechanism to maintain a constant draw of power from the power supply that can be allocated to the components of the device or system.

Figure 4:
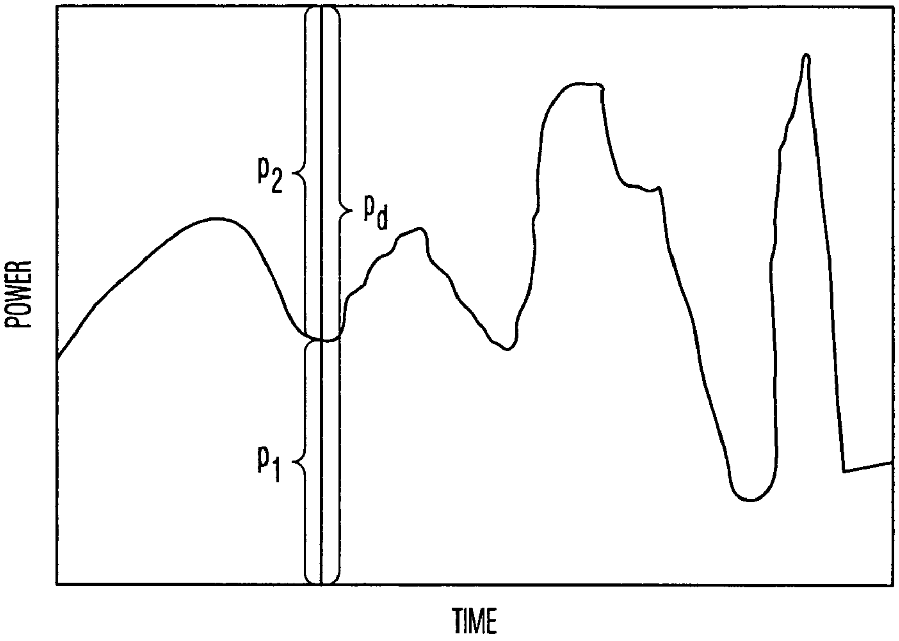
FIG. 4 illustrates an exemplary graph showing the power consumption of a device or system embodiment.

FIG. 4 illustrates an exemplary graph showing the power consumption of a device or system embodiment. The graph is defined by the X-axis indicating time and the Y-axis indicating power. As such, the data within the graph represents the amounts of power over a period of time.

In the embodiment shown in FIG. 4, a desired amount of power (e.g., the total power from the power supply that is allocated to the device or system) is illustrated and identified by the symbol $P_d$. As an illustrative example, the graph of FIG. 4 can be used to illustrate the power consumption of the electrical circuit described in FIG. 3. For example, the power allocated to the first components (e.g., the product load of the device or system of FIG. 3) is identified as $P_1$ in FIG. 4. The power allocated to the second components by the power control (e.g., the dryer load for a media dryer in FIG. 3) is identified as $P_2$ in FIG. 4.

In embodiments such those described by FIG. 4, as the first components $P_1$ use more power, less power is allocated to the second components $P_2$ by the power control, while the total power $P_d$ provided by the power supply remains constant. And, as the first components $P_1$ use less power, more power is allocated to the second components $P_2$ by the power control, while the total power $P_d$ remains constant, as in the previous case. The graph illustrates that in such embodiments, when the power drawn for the first components is added to the power drawn by the second components, the total power drawn will be a constant amount drawn from the power supply over time.

In this way, the second components can receive the maximum power that is available to the system or device, based upon the amount that is being used by the other components, rather than an amount based upon an estimate of maximum power that could be used by such components. This can allow the second components to use more power during operation of the device or system. The allocation based upon the monitoring of the usage of the components during operation can allow for active allocation of power to some of the components of the device or system without large variations in the amount of power drawn from the power supply.

Figure 5:
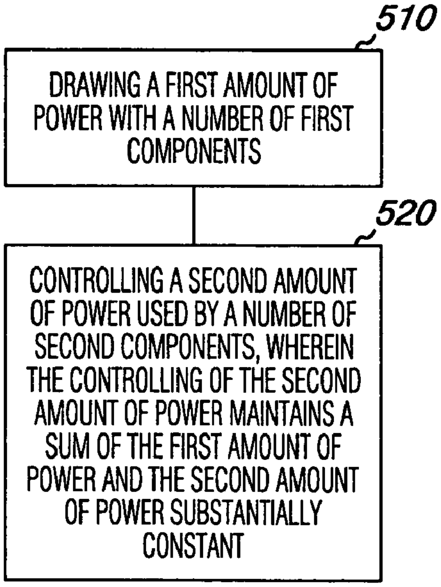
FIG. 5 illustrates a method embodiment.

FIG. 5 illustrates a method embodiment. As one of ordinary skill in the art will understand, the embodiments can be performed by software/firmware (e.g., computer executable instructions) operable on the devices shown herein or otherwise. The disclosed subject matter, however, is not limited to any particular operating environment or to software written in a particular programming language. Software, application modules, and/or computer executable instructions, suitable for carrying out embodiments of the present invention, can be resident in one or more devices or locations or in several and even many locations.

Embodiments of the invention can also reside on various forms of computer readable mediums. Those of ordinary skill in the art will understand from reading the present disclosure that a computer readable medium can be any medium that contains information that is readable by a computer. Forms of computer readable mediums can, for example, include volatile and/or non-volatile memory stored on fixed or removable mediums, such as hard drives, disks, computing devices, and the like, among others.

Unless explicitly stated, the method embodiments described herein are not constrained to a particular order or sequence. Additionally, some of the described method embodiments or elements thereof can occur or be performed at the same point in time.

FIG. 5 illustrates a method embodiment. In block 510, the method of FIG. 5 includes drawing a first amount of power with a number of first components. Drawing an amount of power from a power source through use of a number of first components can include allocating a portion of a total amount of power drawn to be drawn for the number of first components.

In the method of FIG. 5, block 520 includes controlling a second amount of power used with a number of second components, wherein the controlling of the second amount of power maintains a sum of the first amount of power and the second amount of power substantially constant.

In various embodiments, the method can also include determining a desired total power to be drawn from a power source and determining the amount of power to be drawn by the number of second components based upon the desired power. Determining the amount of power to be drawn by the number of second components, for example, can be based upon the formula $P_d-P_m=P_e$ wherein $P_d$ is the desired total power, $P_m$ is the total power used by the number of first and second components, and $P_e$ is the difference between the total power and the desired power.

Method embodiments can also include measuring the amount of power that is being drawn by the number of first components and subtracting the measured amount from a target power level to determine the amount of power to be used by the number of second components. Measuring the amount of power drawn by the number of first components can include, for example, measuring with a voltage monitor and/or a current monitor.

Although specific embodiments have been illustrated and described herein, those of ordinary skill in the art will appreciate from reading the present disclosure that any arrangement calculated to achieve the same techniques can be substituted for the specific embodiments shown. This disclosure is intended to cover any and all adaptations or variations of various embodiments of the invention.

It is to be understood that the above description has been made in an illustrative fashion, and not a restrictive one. Combination of the above embodiments, and other embodiments not specifically described herein will be apparent to those of ordinary skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An image forming device, comprising:

at least one first component of the image forming device to draw a first amount of power;

at least one second component of the image forming device; and a power controller of the image forming device for allocating a second amount of power to the at least one second component to maintain a sum of the first amount of power and the second amount of power substantially constant, the second amount of power being a varying amount of power to maintain the sum of the first amount of power and the second amount of power substantially constant, wherein the device further includes:

a current monitor that measures the amount of current consumed by the first and second components; and a voltage monitor that measures the amount of voltage available to the device, and wherein the measurements of current and voltage are used in allocating the second amount of power to the at least one second component, wherein the measured current and the measured voltage determine a measured power value, and wherein the measured power value is subtracted from a desired power value to determine the power to be allocated to the at least one second component.

2. The device of claim 1, wherein the at least one first component is selected from the group including:

a device sub-power supply;

a controllable paper tray; and a printing device display.

3. The device of claim 1, wherein the at least one second component is selected from a group including:

a print media dryer;

a media marking mechanism; and a vacuum hold down system.

4. The device of claim 1, wherein the desired power value is less than a maximum amount of power available from a power supply.

5. The device of claim 1, wherein the desired power value is a defined power threshold.

6. The device of claim 1, wherein the measured current (I) and the measured voltage (V) determine a measured power value based upon a formula P=IV.

7. An image forming device, comprising:

at least one first component of the image forming device to draw a first amount of power;

at least one second component of the image forming device to draw a second amount of power; and means for allocating a second amount of power to the at least one second component to maintain a sum of the first amount of power and the second amount of power substantially constant for the image forming device, the second amount of power being a varying amount of power to maintain the sum of the first amount of power and the second amount of power substantially constant, wherein the means for allocating a second amount of power subtracts a total power value used by the first and second components from a desired power value to determine the amount of power to allocate to the at least one second component.

8. The device of claim 7, wherein the allocation of the substantially constant amount of power is based on the desired power value.

9. The device of claim 7, wherein the allocation of the substantially constant amount of power is based on a maximum circuit power value.

10. The device of claim 7, wherein the allocation of the substantially constant amount of power is based on a power supply circuit breaker rating.

11. The device of claim 7, wherein the means for allocating a second amount of power is a power controller.

12. The device of claim 7 wherein the means for allocating a second amount of power includes one or more power management components that allow for measuring an amount of power provided from a power supply, subtracting an amount of power used by the at least one first component, and allocating an amount of power to the at least one second component.

13. A method, comprising:

drawing a first amount of power with a number of first components of an image forming device; and controlling a second amount of power used by a number of second components of the image formina device, wherein the controlling of the second amount of power maintains a sum of the first amount of power and the second amount of power substantially constant, the second amount of power being a varying amount of power to maintain the sum of the first amount of power and the second amount of power substantially constant, further including determining a total power to be drawn from a power source and determining an amount of power to be drawn by the number of second components based upon the total power, wherein determining the amount of power to be drawn by the number of second components is based upon a formula $P_d - P_m = P_e$ wherein $P_d$ is a desired total power, $P_m$ is a total power used by the number of first and second components, and $P_e$ is the difference between the desired power and the total power.

14. A computer readable medium having instructions for causing an image forming device to perform a method, comprising:

drawing a first amount of power with a number of first components of the image forming device; and controlling a second amount of power used by a number of second components of the image forming device, wherein the controlling of the second amount of power maintains a sum of the first amount of power and the second amount of power substantially constant, the second amount of power being a varying amount of power to maintain the sum of the first amount of power and the second amount of power substantially constant, wherein the method includes measuring an amount of power drawn by the number of first components and subtracting a measured amount from a target power level to determine an amount of power to be used by the number of second components.

15. The medium of claim 14, wherein measuring the amount of power drawn by the number of first components includes measuring with a voltage monitor.

16. The medium of claim 14, wherein measuring the amount of power drawn by the number of first components includes measuring with a current monitor.

17. The medium of claim 14, wherein measuring the amount of power drawn by the number of first components includes measuring with a voltage monitor and a current monitor.

18. An image forming device, comprising:

a power supply:

an electrical circuit of the image forming device connected to the power supply;

a number of first components of the image forming device drawing power from the power supply through the electrical circuit;

a number of second components of the image forming device drawing power from the power supply through the electrical circuit; and a power controller of the image forming device for allocating a varying amount of power to the number of second components in order to draw a substantially constant amount of power from the power supply by a combined total of the number of first components and the number of second components, wherein a measured current and a measured voltage determine a measured power value, and wherein the measured power value is subtracted from a desired power value to determine the varying amount of power to be allocated to the number of second components.

19. The device of claim 18 wherein the first components include components selected from the group including:

a device sub-power supply;

a controllable paper tray; and a printing device display.

20. The device of claim 18 wherein the second components include components selected from a group including:

a print media dryer;

a media marking mechanism; and a vacuum hold down system.

21. An image forming apparatus, comprising:

a power supply;

a power measurement component of the image fonning apparatus;

a number of first components of the image forming apparatus drawing power from the power supply;

a number of second components of the image forming apparatus drawing power from the power supply; and a power controller of the image forming apparatus for allocating a varying amount of power to the number of second components in order to draw a substantially constant amount of power from the power supply by a combined total of the number of first components and the number of second components, wherein the apparatus further includes a calculation component to determine the amount of power to be drawn by the number of second components based upon a formula $P_d - P_m = P_e$ wherein $P_d$ is a desired total power, $P_m$ is a total power used by the number of first and second components, and $P_e$ is a difference between the desired power and the total power.

22. The apparatus of claim 21, wherein the power measurement component measures a product power load based upon information provided by a number of power usage monitors.

23. The apparatus of claim 21 wherein the number of power usage monitors include a voltage monitor and a current monitor.

* * * * *

UNITED STATES PATENT AND TRADEMARK OFFICE

CERTIFICATE OF CORRECTION

PATENT NO. : 7,519,837 B2
APPLICATION NO. : 10/869673
DATED : April 14, 2009
INVENTOR(S) : David E. Smith et al.

It is certified that error appears in the above-identified patent and that said Letters Patent is hereby corrected as shown below:

In column 10, line 41, in Claim 13, delete “formina” and insert -- forming --, therefor.

In column 11, line 20, in Claim 18, delete “supply:” and insert -- supply; --, therefor.

In column 12, line 1, in Claim 19, after “claim 18” insert -- , --.

In column 12, line 6, in Claim 20, after “claim 18” insert -- , --.

In column 12, line 13, in Claim 21, delete “fonning” and insert -- forming --, therefor.

Signed and Sealed this

Tenth Day of November, 2009

David J. Kappos

David J. Kappos
*Director of the United States Patent and Trademark Office*